Figure 1:
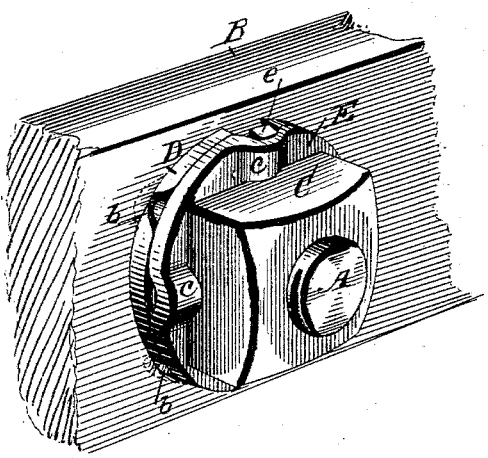

No. 752,207. PATENTED FEB. 16, 1904.
J. DICKASON.
NUT LOCK.
APPLICATION FILED DEC. 22, 1903.
NO MODEL.

Inventor
Jonathan Dickason,
By Chas. H. Fowler
Attorney

Witnesses
C. J. Williamson
M. E. Moore

No. 752,207. Patented February 16, 1904.

UNITED STATES PATENT OFFICE.

JONATHAN DICKASON, OF LARUE, OHIO, ASSIGNOR OF ONE-HALF TO JAMES CROWLEY, OF LARUE, OHIO.

NUT-LOCK.

SPECIFICATION forming part of Letters Patent No. 752,207, dated February 16, 1904.

Application filed December 22, 1903. Serial No. 186,156. (No model.)

*To all whom it may concern:*

Be it known that I, JONATHAN DICKASON, a citizen of the United States, residing at Larue, in the county of Marion and State of Ohio, have invented certain new and useful Improvements in Nut-Locks; and I do hereby declare that the following is a full, clear, and exact description of the same, reference being had to the annexed drawings, making a part of this specification, and to the letters of reference marked thereon.

The present invention has for its object to provide a nut-lock that will be simple in construction and effective in securely holding the nut from turning upon the bolt and at the same time admit of the nut being readily removed when desired, the lock firmly holding the nut upon the bolt against becoming loose by the constant jarring; and it consists in a nut-lock constructed substantially as shown in the drawings and hereinafter described and claimed.

Figure 2:
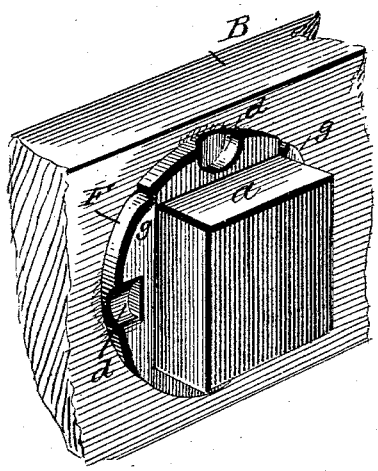
Figure 3:
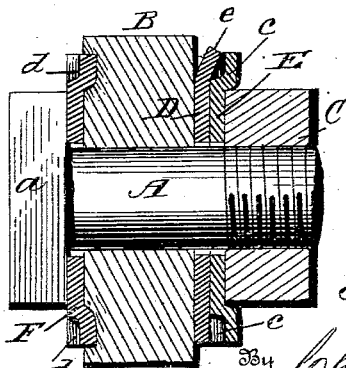

Figure 1 of the drawings is a perspective view of a nut-lock embodying my invention, showing the nut locked upon the bolt; Fig. 2, a similar view showing the bolt-head and locking-washer; Fig. 3, a sectional view of Fig. 1.

In the accompanying drawings, A represents the bolt of the usual construction having the bolt-head $a$, said bolt extending through a plate or other object to which the bolt is fastened, as indicated at B. There are two washers employed for locking the nut C upon the bolt A, said washers being indicated at D E, the former resting against the object B and the latter coming in direct contact with the nut.

The washer D has shoulders $b$ upon one of its sides, formed by indenting the washer or crimping it, which shoulders are forced into the wood or when of metal engaging indentations therein, whereby the washer is held stationary and prevented from turning.

The washer D has a spring-pawl $e$ formed by radial cuts in the washer and is sufficiently resilient to engage the recess in one of the concavo-convex shoulders $c$ in the washer E, as shown in Fig. 1 of the drawings.

The washer E is preferably formed with four of the concavo-convex shoulders $c$, which shoulders bear against the sides of the nut C and prevent it from turning, said washer being held stationary by the spring-pawl $e$, engaging one of the recesses in the shoulders, thereby providing a perfect lock for the nut and preventing it from turning upon the bolt.

If desired, a washer may be used for the head $a$ of the bolt A, as shown at F, said washer having indentations or projections $d$ around its edge to embed themselves in the wood or when the object B is of metal to engage depressions therein to hold the washer against turning.

The washer F has slits therein to form spring-flanges $g$ around its periphery and against which the sides of the bolt-head abut, thereby providing means for preventing the bolt from turning as well as the nut.

When the wrench is applied to the nut, the washer E will turn with the nut, and the curved recess of the concavo-convex shoulder $c$ will act as a cam to depress the spring-pawl $e$ and allow the washer and nut to turn until the next shoulder of the washer will come opposite the pawl, when said pawl will engage the recess in the shoulder and hold said washer stationary, which will securely hold the nut against turning, the nut being locked at every quarter-turn as the recess of the shoulder comes on line with the spring-pawl of the under washer.

In reversing the turning of the nut to disengage it from the bolt it is accomplished in in the same manner as described above and without any inconvenience.

The washer F for the bolt-head may be constructed in any suitable manner so long as it is provided with means for holding it stationary, and any suitable means in place of the spring-flange $g$ may be used that will prevent the bolt from turning by coming in contact with the head thereof.

Having now fully described my invention, what I claim as new, and desire to secure by Letters Patent, is—

A nut-lock comprising two washers extending under the nut to prevent it from turning, one of said washers having means for holding it stationary and provided with a spring-pawl, and the other washer which comes in direct contact with the nut having a plurality of concavo-convex shoulders to prevent the nut from turning independently thereof, said shoulders coming in contact with the sides of the nut and the concaved or recessed portion of the shoulders serving as cams by which the pawl is released as the nut and washer is turned and locked when the pawl engages the recessed portion of the shoulders, substantially as and for the purpose set forth.

In testimony whereof I affix my signature in presence of two witnesses.

JONATHAN DICKASON.

Witnesses:
C. S. CROWLEY,
WILLIS CLARK.